United States Patent [19]
Holmström et al.

[11] Patent Number: 5,381,721
[45] Date of Patent: Jan. 17, 1995

[54] RELEASE UNIT, AND RELEASE SYSTEM COMPRISING AT LEAST ONE SUCH RELEASE UNIT

[75] Inventors: Peter Holmström, Lidingö; Sven Pettersson, Vällingby, both of Sweden

[73] Assignee: NobelTech Electronics, Jarfalla, Sweden

[21] Appl. No.: 181,960

[22] Filed: Jan. 18, 1994

Related U.S. Application Data

[63] Continuation of Ser. No. 953,964, Sep. 30, 1992, abandoned.

[30] Foreign Application Priority Data

Oct. 2, 1991 [SE] Sweden .................. 9102845

[51] Int. Cl.$^6$ ...................... F41A 1/00; F42B 4/26
[52] U.S. Cl. ...................... 89/1.51; 89/1.41; 89/1.816
[58] Field of Search ............. 89/1.51, 1.54, 1.41, 89/1.816

[56] References Cited

U.S. PATENT DOCUMENTS

| | | | |
|---|---|---|---|
| 3,499,363 | 3/1970 | Lauro | 89/1.51 |
| 3,524,387 | 8/1970 | Miller | 89/1.51 |
| 3,534,653 | 10/1970 | Specht et al. | 89/1.54 |
| 3,808,940 | 5/1974 | Schillreff et al. | 89/1.51 |
| 4,063,485 | 12/1977 | Carter et al. | 89/1.51 |
| 4,222,306 | 9/1980 | Maury | 89/1.41 |
| 4,233,882 | 11/1980 | Eichweber | 89/1.41 |
| 4,601,445 | 7/1986 | Duclos et al. | 89/1.51 |
| 4,682,529 | 7/1987 | Duclos et al. | 89/1.51 |
| 4,941,392 | 7/1990 | Huetter | 89/1.51 |
| 5,153,367 | 10/1992 | Markquart et al. | 89/1.816 |

*Primary Examiner*—David Brown
*Attorney, Agent, or Firm*—Pollock, Vande Sande & Priddy

[57] ABSTRACT

A release unit for launching countermeasures from a vehicle. A first module in the form of a central body mounted on the vehicle. The first module includes at least three openings: a first opening facing the vehicle when the first module is mounted on the vehicle, and second and third openings directed obliquely with respect to the first opening in substantially opposite directions from each other. The directions the second and third openings face are separated by 60°–120°. A second module and a third module in the form of release cassettes are received respectively by the second and third openings and removably fixed by with a locking member. A plurality of countermeasures are launched from the release units. Each release cassette includes a plurality of countermeasure openings for receiving the countermeasures. The countermeasure openings in each cassette are aimed substantially in the same direction. A plurality of the countermeasures are launched to delimited spaces from each cassette, creating separate decoys without any movement of the release unit relative to the vehicle on which it is mounted. The countermeasures launched from the second module are launched away from the vehicle in substantially a first direction creating a first decoy and the countermeasures launched from the third module are launched away from the vehicle in substantially a second direction separated from said first direction by 60°–120° creating a second decoy. The first and second decoys are non-overlapping and separated from each other by a distance corresponding to the angle between the cassettes.

18 Claims, 3 Drawing Sheets

RELEASE UNIT, AND RELEASE SYSTEM COMPRISING AT LEAST ONE SUCH RELEASE UNIT

This application is a continuation of Ser. No. 07/953,964 filed on Sep. 30, 1992, now abandoned.

FIELD OF THE INVENTION

The present invention relates to a release unit for launching countermeasures and/or for signal activity and a release system comprising at least one such release unit.

BACKGROUND OF THE INVENTION

A release device or release unit normally has one single direction of opening for launching and/or signal activity. Examples of such release units are shown in Swedish Patent B8302508-0 or EP B0 067 733. Such known release devices are well suited for application in an airplane and similar aircraft in the normal travel of the craft when its direction of movement does not significantly vary in relation to the direction of opening of the release device. In helicopters with a high capability of movement in different directions relative to the helicopter fuselage, for example, and which travel at relatively low speeds and at certain times can be almost considered to be standing still in relation to the environment, the release device of the above known type with only one direction of opening provides unsatisfactory protection. The protection can be improved by mounting several release devices on the craft. However, this becomes costly and also results in a significant increase in weight.

In this connection, launching of countermeasures in two directions previously known through U.S. Pat. No. 3,135,511 can also be mentioned. In this case, countermeasures are launched in the form of flares from a target towed by an aircraft. Before launching, the flares are stored in flare holders constructed in the towed target. The design only provides a strictly limited variation in the launching direction of the flares and only has the aim of launching countermeasures at the rear of the aircraft. Limiting of the launching directions is in any case necessary so that the aircraft does not risk being hit by launched countermeasures. By using a towed target for launching the countermeasures, it is also necessary that the airplane or craft travels forward at a considerable speed. The design is not applicable under the movement conditions characteristic for helicopters.

SUMMARY OF THE INVENTION

It is a purpose of the present invention to produce a release unit which also provides good protection with applications, for example helicopter applications or slow flight, where known release devices according to the above are unsatisfactory, but which still has a simple design.

The aim of the invention is achieved by means of a release unit which is constructed of modules and comprises a first module in the form of a central body accommodating the electronics for the activation of the counter means and a number of other modules in the form of release cassettes corresponding to the number of directions of opening, which central body is designed for receiving the release cassettes in directions corresponding to the directions of opening of the release unit.

By the release unit having several directions of opening, the release cassette that is thought to provide the highest protection in the prevailing situation can be activated. The release unit makes it possible for the conceivable directions of attack against the craft to be covered in a better way and thus provides the possibility for producing a satisfactory protection for the craft. The modular construction makes it possible for the release cassettes of the release unit to be easily exchanged for new loaded release cassettes with the same or another type of ammunition as required. The electronics of the central body are common to the incoming release cassettes and activate these depending on information supplied and stored in the electronics.

An advantageous embodiment of the present invention release unit, comprises two directions of opening with one release cassette belonging to each direction of opening. Such a release unit is adapted for mounting on the long side of a fuselage, preferably a helicopter. Launching of countermeasures can thus be achieved at an angle towards the back according to one direction of opening and at angle towards the front according to the second direction of opening. The directions of opening can be advantageously separated by 60°–120° and preferably 90°. This provides all around cover with two release units with two directions of opening each, which release units are placed each on its own long side of the fuselage.

The release system according to the invention comprises at least one release unit as described above and one control unit coupled to the electronics of the release units for controlling the release process of the respective release unit. The control unit, which is preferably placed in the pilot's cabin of the craft and coupled to a number of release units on the outside of the craft, forms, together with the release units, a simple modular design which also provides good protection for slow moving or stationary vehicles.

The control unit advantageously controls the release process of the release units in relation to the detected direction of the threat and to the movement of the vehicle on which the release units are mounted.

The present invention will be described in greater detail below with reference to the attached drawings, in which:

BRIEF DESCRIPTION OF THE DRAWINGS

The release unit 1 shown in FIG. 1 consists of a first module in the form of a central body 2 and two other modules in the form of release cassettes 3, 4. Each release cassette 3, 4 is arranged to accommodate a number of shells with countermeasures ammunition. In FIG. 1, twelve openings 5 for receiving these shells are shown. The number of shells per release device can amount to significantly more than the twelve indicated. Instead of shells with circular cross section, other shapes can be used, for example shells with circular cross section [sic]. The release cassettes 3 and 4 are fixed to the central body 2 by means of locking elements 6, 7. The release cassettes 3, 4 can be easily replaced with new release cassettes when the ammunition of the release cassettes is used up, or change to other ammunition if required, by a simple actuation of the locking elements 6, 7.

The central body 2 accommodates electronic 21 for activating the countermeasures in the two release cassettes 3, 4. On the basis of information about which type of ammunition the release cassettes are loaded with, how often the ammunition shall be activated, how much shall be activated and in which direction or directions, the electronics in the central body cause the countermeasures to be activated. This information can be obtained from a control unit shown in FIG. 3. Information about the type of ammunition can also be supplied from the release cassettes.

Figure 1:
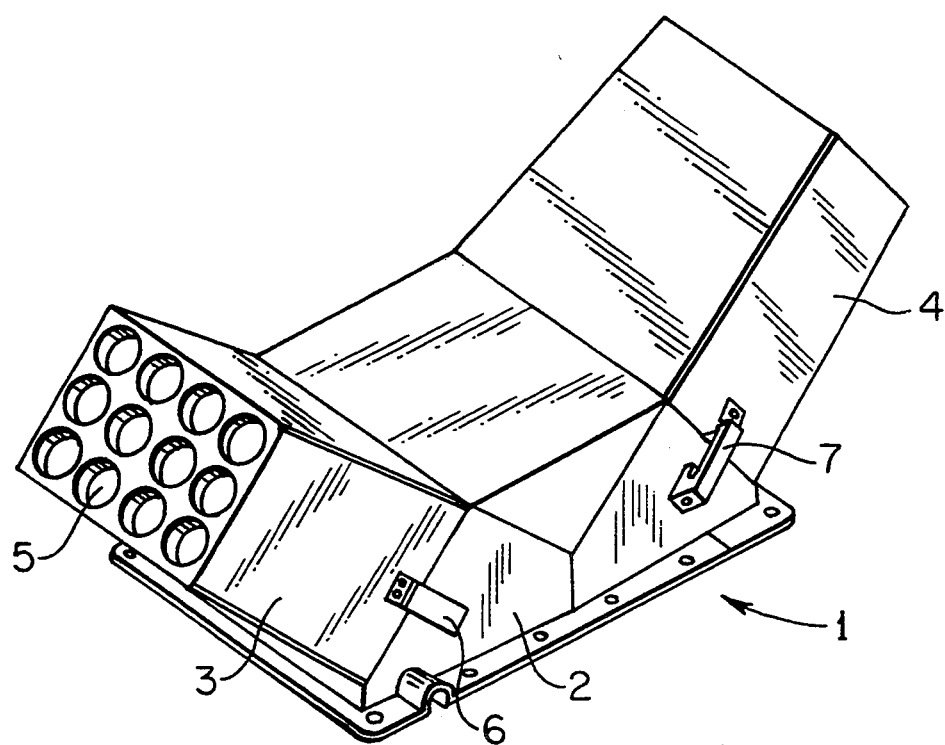
FIG. 1 shows a release unit according to the present invention in a perspective view.
Figure 2:
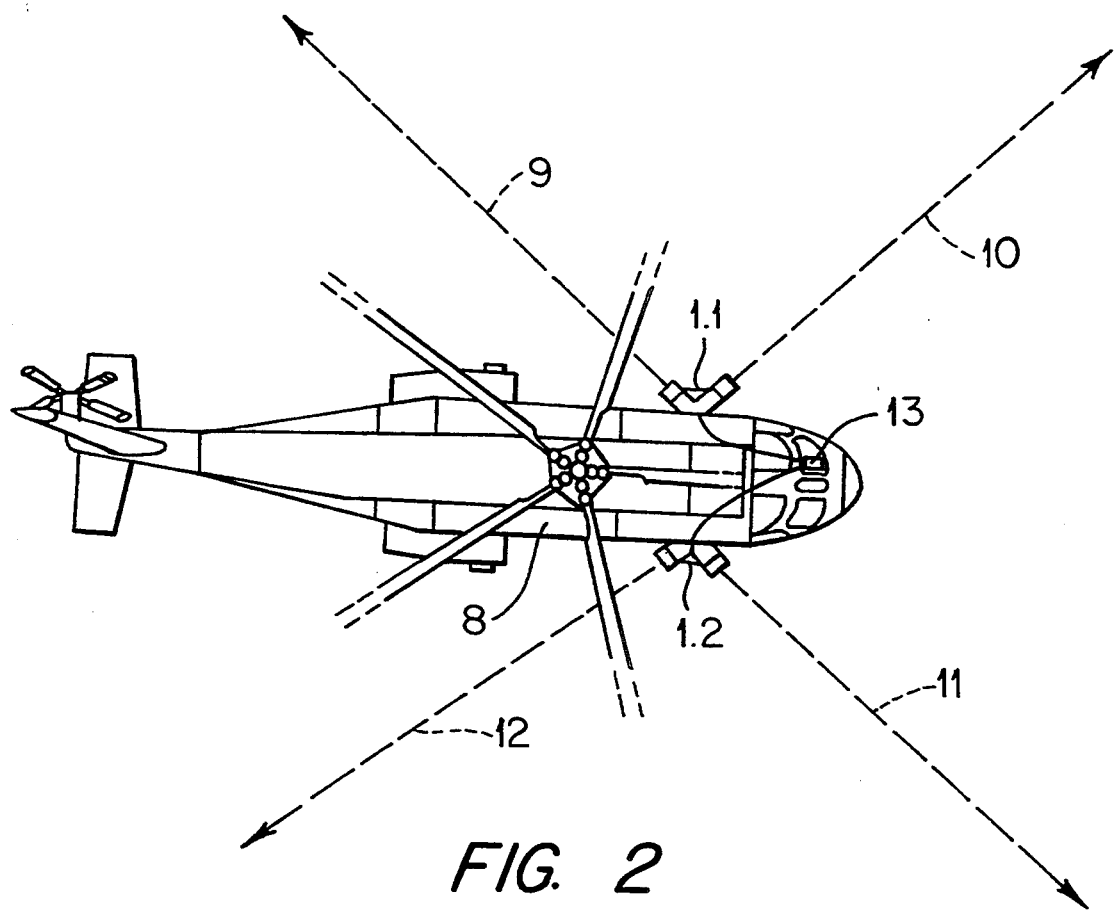
FIG. 2 shows a release system according to this invention comprising two release units, which release system is shown incorporated in a helicopter's equipment.

FIG. 2 shows a release system comprising two release units 1.1, 1.2 according to FIG. 1. The release units are mounted one on each long side of a helicopter 8. Due to the assembly of the release units 1 as shown, four directions of opening 9, 10, 11, 12 have been produced in the horizontal plane of the helicopter 8. The release units 1.1, 1.2 are connected to a control unit 13 which is described in greater detail below with reference to FIG. 3.

Figure 3:
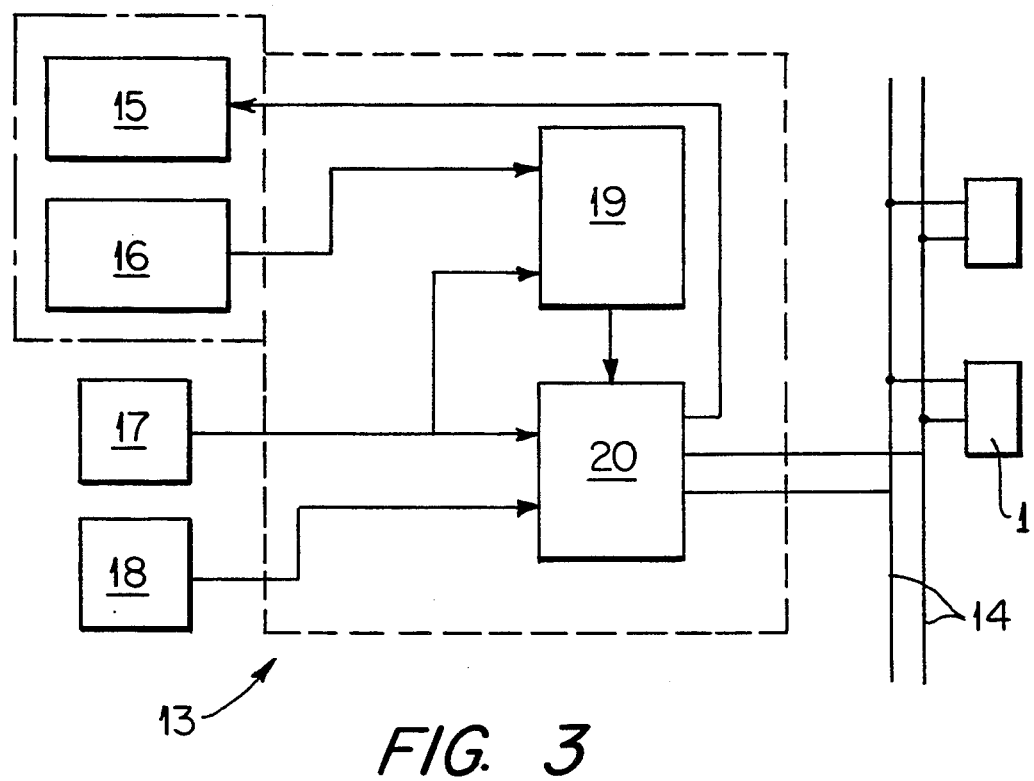
FIG. 3 shows an example of a control unit incorporated in the release system.

The control unit 13 shown in FIG. 3 is connected to a number of release units 1 and electronic means 20 via a datalink 14. The control unit 13 delivers status information to the cockpit on a display 15. Operating elements 16 for manually feeding in instructions from the cockpit are connected to the display 15. A threat alarm 17 provides information to the control unit 13 about detected threats and air data are fed in from air data-recording elements 18. From a library 19 incorporated in the control unit 13, and in which a number of response algorithms are stored, a suitable response algorithm is taken when the threat alarm 17 has specified the type of threat. On the basis of information accessible in the control unit, release units are selected in and release parameters are calculated in a calculating element 20, whereafter calculated parameters are transferred to the electronics in the release units in question.

Figure 4A:
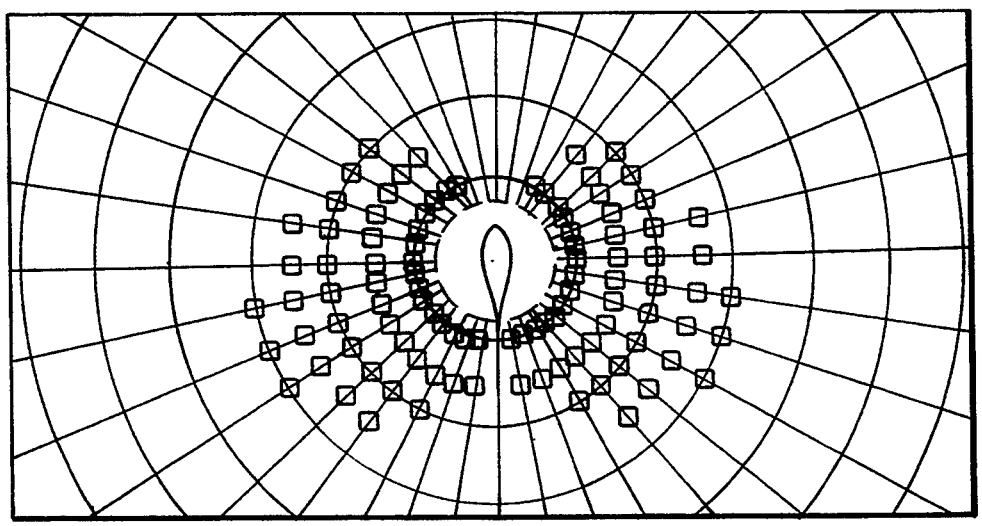
FIGS. 4a–4c show positions which result in hits scored on a helicopter in a simulated example for a helicopter without countermeasures equipment, FIG. 4a, with conventional countermeasures equipment, FIG. 4b and with countermeasures equipment according to the present invention, FIG. 4c.
Figure 4B:
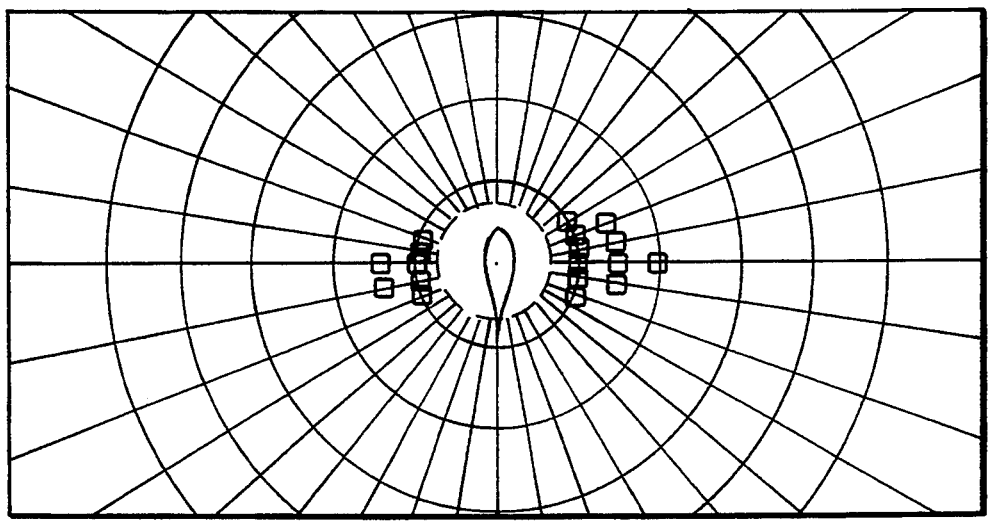
Figure 4C:
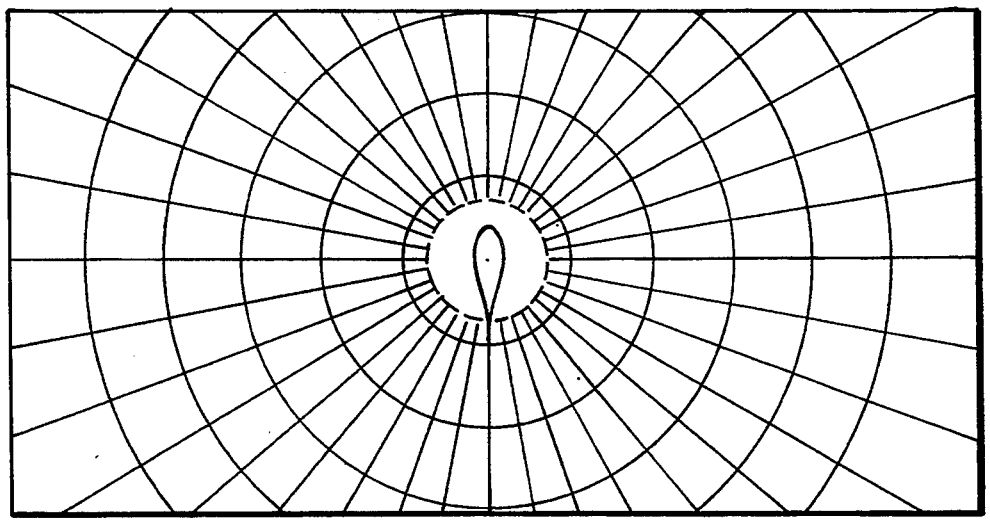

FIGS. 4a–4c show the results obtained with simulated firing on a helicopter without countermeasures equipment according to FIG. 4a, with conventional countermeasures equipment according to FIG. 4b, and with the countermeasures equipment according to the present invention according to FIG. 4c. A firing has been carried out for every 500 meters and no closer than 1000 m and for every tenth degree. Each square in the figures indicates a position from which firing successfully puts the helicopter out of action. As can be seen in FIG. 4a, the possibilities of the helicopter avoiding hits are small. The helicopter can get clear mainly when the firing is from the front. As can be seen in FIG. 4b, the possibilities for the helicopter to get clear increases if it is equipped with conventional countermeasures equipment. However, firing from the side results in hits on the helicopter. With countermeasures equipment according to the present invention, the helicopter avoids all hits under the given conditions, which can be seen in FIG. 4c. The same type of helicopter, ammunition and automatic threat system were utilized in the simulated firing.

We claim:
1. A release unit for launching countermeasures from a vehicle, said release unit comprising:
a first module in the form of a central body fixedly mounted on said vehicle, said first module including at least three openings, a first opening facing said vehicle when said first module is mounted on said vehicle, second and third openings being directed obliquely with respect to the first opening in substantially opposite directions from each other, the directions the second and third openings face being separated by 60°–120°;
a second module and a third module in the form of release cassettes received respectively by the second and third openings of the first module, the second and third modules being received by said first module in the directions of the second and third openings respectively;
locking means for removably fixing said second and third modules to said first module;
a plurality of countermeasures to be launched from said release units;
each of said release cassettes includes a plurality of countermeasure openings for receiving said countermeasures, said countermeasure openings in each cassette being aimed substantially in the same direction, said counter measures in said second and third modules being launched in directions being separated by 60°–120°; and
wherein a plurality of said countermeasures are launched to delimited spaces from each said cassette creating separate decoys without any movement of the release unit relative to the vehicle on which it is mounted, the countermeasures launched from said release cassettes of said second module are launched away from the vehicle in substantially a first direction creating a first decoy and the countermeasures launched from said release cassette of said third module are launched away from the vehicle in substantially a second direction separated from said first direction by 60°–120° creating a second decoy, said first and second decoys being non-overlapping and spatially separated from each other by a distance corresponding to the angle between the cassettes.

2. The release unit according to claim 1, wherein said release unit further comprises:
a fourth module in the form of a central body fixedly mounted on said vehicle, said fourth module including at least three openings, a first opening facing said vehicle when said first module is mounted on said vehicle, second and third openings being directed obliquely with respect to the first opening in substantially opposite directions from each other, the directions the second and third openings face being separated by 60°–120°;
a fifth module and a sixth module in the form of release cassettes received respectively by the second and third openings of the fourth module, the fifth and sixth modules being received by said fourth module in the directions of the second and third openings respectively;
locking means for removably fixing said fifth and sixth modules to said fourth module;
a plurality of countermeasures to be launched from said release units;
each of said release cassettes includes a plurality of countermeasure openings for receiving said countermeasures, said countermeasure openings in each cassette being aimed substantially in the same direction, said counter measures in said fifth and sixth modules being launched in directions being separated by 60°-120°; and wherein a plurality of said countermeasures are launched to delimited spaces from each said cassette creating separate decoys without any movement of the release unit relative to the vehicle on which it is mounted and without movement of the vehicle relative to the ground, the countermeasures launched from said release cassettes of said fifth module are launched away from the vehicle in substantially a third direction creating a third decoy and the countermeasures launched from said release cassette of said sixth module are launched away from the vehicle in substantially a fourth direction separated from said third direction by 60°-120° creating a fourth decoy, said third and fourth decoys being non-overlapping and spatially separated from each other by a distance corresponding to the angle between the cassettes;

wherein the direction away from said vehicle of any of said decoys is separated from the direction of any other of said decoys by at least 60°.

3. The release unit according to claim 2, wherein said vehicle is slow moving or substantially stationary.

4. The release unit according to claim 2, wherein said countermeasures include at least one of the following: chaff, flares, smoke, shells, and ammunition.

5. The release unit according to claim 2, wherein said vehicle is an aircraft.

6. The release unit according to claim 2, wherein the directions of the second opening and the third opening are separated essentially by 90°.

7. The release unit according to claim 2, further comprising:

electronic means for activating the countermeasures, said electronic means being included in said first module; and a control unit in the vehicle body for controlling said electronic means, said control means being connected to the electronic means via said first opening.

8. The release unit according to claim 7, wherein said control unit includes means for controlling release characteristics of the release units in dependence upon a detected direction of a threat and a movement of the vehicle.

9. The release unit according to claim 7, wherein said control unit includes means for varying the number of countermeasures launched by said cassettes.

10. A release system, comprising:

at least one release unit, said release unit comprising:
a first module in the form of a central body fixedly mounted on a vehicle, said first module including at least three openings, a first opening facing said vehicle when said first module is mounted on said vehicle and second and third openings being directed obliquely with respect to the first opening in substantially opposite directions from each other, the directions the second and third openings face being separated by 60°-120°; a second module and a third module in the form of release cassettes received respectively by the second and third openings of the first module, the second and third modules being received by said first module in the directions of the second and third openings respectively; locking means for removably fixing said second and third modules to said first module; a plurality of countermeasures to be launched from said at least one release unit; each of said release cassettes includes a plurality of countermeasure openings for receiving said countermeasures, said countermeasure openings in each cassette being aimed substantially in the same direction, said counter measures in said second and third modules being launched in directions being separated by 60°-120°; and wherein a plurality of said countermeasures are launched to delimited spaces from each said cassette creating separate decoys without any movement of the release unit relative to the vehicle on which it is mounted, the countermeasures launched from said release cassettes of said second module are launched away from the vehicle in substantially a first direction creating a first decoy and the countermeasures launched from said release cassette of said third module are launched away from the vehicle in substantially a second direction separated from said first direction by 60°-120° creating a second decoy, said first and second decoys being non-overlapping and spatially separated from each other by a distance corresponding to the angle between the cassettes; and a control unit coupled to an electronic means of the release units, said control unit including means for controlling the release process of the respective release unit.

11. The release system according to claim 10 wherein said release system comprises two release units, wherein said release units create four decoys, wherein the direction away from said vehicle of any of said decoys is separated from the direction away from said vehicle of any other of said decoys by at least 60°.

12. The release system according to claim 10, wherein said vehicle is slow moving or substantially stationary.

13. The release system according to claim 10, wherein said countermeasures include at least one of the following: chaff, flares, smoke, shells, and ammunition.

14. The release system according to claim 10, further comprising:

electronic means for activating the countermeasures, said electronic means being included in said first module, and wherein said control unit is coupled to the electronic means.

15. The release system according to claim 10, wherein said vehicle is an aircraft.

16. The release system according to claim 10, wherein said control unit includes means for varying the number of countermeasures launched by said cassettes.

17. The release system according to claim 10, wherein the directions the second and third openings face are separated by substantially 90°.

18. The release system according to claim 17, wherein the control unit includes means for controlling the release characteristics of the release units in dependence on the detected direction of the threat and the movement of the vehicle on which the release units are mounted.

* * * * *